(12) United States Patent
Wilson et al.

(10) Patent No.: US 10,882,203 B2
(45) Date of Patent: Jan. 5, 2021

(54) FOOD SLICER WITH UPPER CONVEYOR UNIT CONTROL

(71) Applicant: Marlen International, Inc., Riverside, MO (US)

(72) Inventors: Douglas D. Wilson, Platte City, MO (US); Brian J. Herr, Olathe, KS (US)

(73) Assignee: Marlen International, Inc., Riverside, MO (US)

(*) Notice: Subject to any disclaimer, the term of this patent is extended or adjusted under 35 U.S.C. 154(b) by 0 days.

(21) Appl. No.: 16/122,529

(22) Filed: Sep. 5, 2018

(65) Prior Publication Data
US 2019/0084174 A1  Mar. 21, 2019

Related U.S. Application Data

(60) Provisional application No. 62/559,885, filed on Sep. 18, 2017.

(51) Int. Cl.
| | | |
|---|---|---|
| A22C 17/00 | (2006.01) | |
| B26D 7/06 | (2006.01) | |
| B26D 7/02 | (2006.01) | |
| B26D 1/143 | (2006.01) | |

(52) U.S. Cl.
CPC ........ B26D 7/0625 (2013.01); A22C 17/0033 (2013.01); B26D 1/143 (2013.01); B26D 7/02 (2013.01); B26D 2210/02 (2013.01)

(58) Field of Classification Search
CPC ........ B26D 7/0625; B26D 1/143; B26D 7/02; B26D 2210/02; A22C 17/0033
See application file for complete search history.

(56) References Cited

U.S. PATENT DOCUMENTS

| | | | | |
|---|---|---|---|---|
| 3,476,089 A | * | 11/1969 | Jerome | A01K 45/005 |
| | | | | 119/846 |
| 4,163,406 A | * | 8/1979 | Crawford | B26D 7/0625 |
| | | | | 144/248.5 |
| 4,796,821 A | * | 1/1989 | Pao | A24B 7/02 |
| | | | | 241/101.2 |
| 5,746,648 A | * | 5/1998 | Boeyen | A22B 5/0029 |
| | | | | 452/156 |
| 2006/0154587 A1 | * | 7/2006 | Mikkelsen | A22C 17/0086 |
| | | | | 452/150 |
| 2008/0223229 A1 | | 9/2008 | Biggs et al. | |

(Continued)

FOREIGN PATENT DOCUMENTS

EP      0931630 A2      7/1999

*Primary Examiner* — Andrea L Wellington
*Assistant Examiner* — Liang Dong
(74) *Attorney, Agent, or Firm* — Hovey Williams LLP (57) ABSTRACT

Processing apparatus such as a food slicer (10) includes upper and lower conveyor units (16, 14) having shiftable conveyor belts (40, 22) designed to receive incoming products and to move such products along a path of travel (124) through the conveyor units (16, 14) and into a slicer assembly (18). The upper conveyor unit (16) is equipped with control apparatus (72) serving to maintain a predetermined, substantially constant force against products passing through the conveyor units (16, 14). The upper conveyor unit (16) is bidirectionally pivotal about respective axes parallel with the path of travel (124), and transverse thereto. This allows the slicer 10 to accommodate products of varying size, shape, and makeup.

15 Claims, 7 Drawing Sheets

(56) References Cited

U.S. PATENT DOCUMENTS

2009/0308024 A1* 12/2009 Yokota ................. B65B 5/08
                                                       53/235
2010/0304652 A1* 12/2010 Bolte ................. A22C 17/002
                                                       452/157

* cited by examiner

FOOD SLICER WITH UPPER CONVEYOR UNIT CONTROL

CROSS-REFERENCE TO RELATED APPLICATION

This application claims the benefit of provisional patent application Ser. No. 62/559,885 filed Sep. 18, 2017, which is incorporated herein by reference in its entirety.

BACKGROUND OF THE INVENTION

Field of the Invention

The present invention is broadly concerned with dual, upper and lower conveyor assemblies operable to move products toward and into a downstream processing device, such as a slicer, while accommodating products of different sizes, shapes, and makeups. More particularly, the invention is concerned with such conveyor assemblies, and improved upper conveyor units forming a part thereof, where the force exerted by the upper conveyor unit on the products is substantially constant and controlled, and the upper conveyor unit can pivot as necessary to accommodate irregular products.

Description of the Prior Art

Dual, upper and lower conveyor unit processing devices, such as slicers, are known in the art. See, e.g., U.S. Patent Publication No. 2008/0223229 and EP Patent No. 0931630. In general, these devices employ upper and lower driven conveyor belts which cooperatively shift product to be processed along a path of travel into and through a downstream processor. However, these prior units are plagued with a number of problems. First, the upper conveyor unit, bearing upon the products to be processed, can degrade such products owing to the weight of the upper conveyor unit. While up-and-down adjustment of the height of the upper conveyor unit relative to the lower conveyor unit has been provided, there is no provision for dynamic control of the height of the upper conveyor unit so as to accommodate products of varying size or shape.

Another problem in prior dual conveyor devices is that they do not easily accommodate products having uneven cross-section. This stems from the fact that the position of the upper conveyor unit is constant. As such, irregular products can shift or skew as the products pass through the dual conveyors, leading to improperly processed products.

SUMMARY OF THE INVENTION

The problems outlined above are solved in the present invention. Specifically, a conveyor assembly is provided which is operable to move product towards and into a downstream processing device, such as a slicer. Such a conveyor assembly generally comprises a lower conveyor unit having a shiftable lower conveyor belt presenting an upper run and a lower run, together with an upper conveyor unit having a shiftable upper conveyor belt presenting an upper run and a lower run. Structure is provided to support the upper conveyor unit above the lower conveyor unit with the lower run of the upper conveyor belt adjacent the upper run of the lower conveyor belt to define therebetween a product passageway, so that shifting of the upper and lower conveyor belts will move product along a path of travel toward and into the downstream processing device. This support structure includes control apparatus operably coupled with the upper conveyor unit to maintain a predetermined, substantially constant force against the product as it is moved by the upper and lower conveyor belts, notwithstanding irregularities in the size and shape of the product.

In an embodiment, the control apparatus comprises a pneumatic piston-and-cylinder assembly coupled with the upper conveyor unit and operable to raise and lower the upper conveyor unit in order to maintain the substantially constant downwardly directed force against the product. Furthermore, the upper conveyor unit includes pivoting mechanism allowing the upper conveyor unit to pivot about an axis generally parallel with the product path of travel, and also about an axis transverse to the path of the travel.

DETAILED DESCRIPTION OF THE PREFERRED EMBODIMENT

Figure 1:
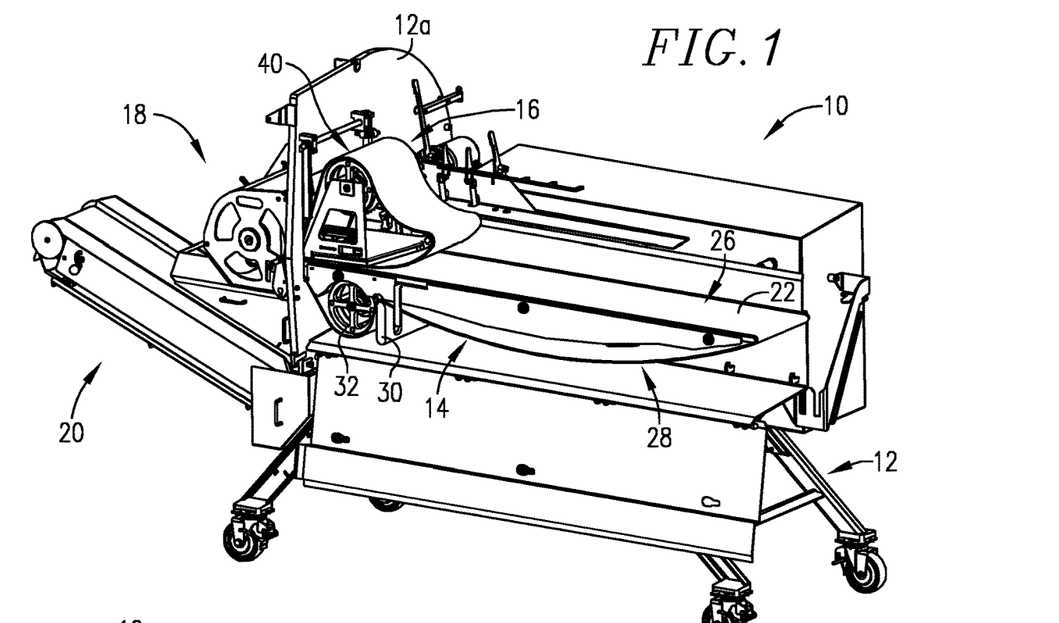
FIG. 1 is a perspective view of a dual conveyor belt slicer apparatus in accordance with the invention.

Turning now to FIG. 1, slicer apparatus 10 in accordance with the invention broadly includes a mobile frame 12 including an upstanding bulkhead 12a supporting a lower conveyor unit 14, an upper conveyor unit 16, a slicer assembly 18, and an output conveyor 20. The purpose of slicer 10 is to receive incoming meat or other products, and to advance such products using the conveyor units 14, 16 into and through the slicer assembly 18. Sliced products then fall onto output conveyor 20 for further downstream processing.

Figure 2:
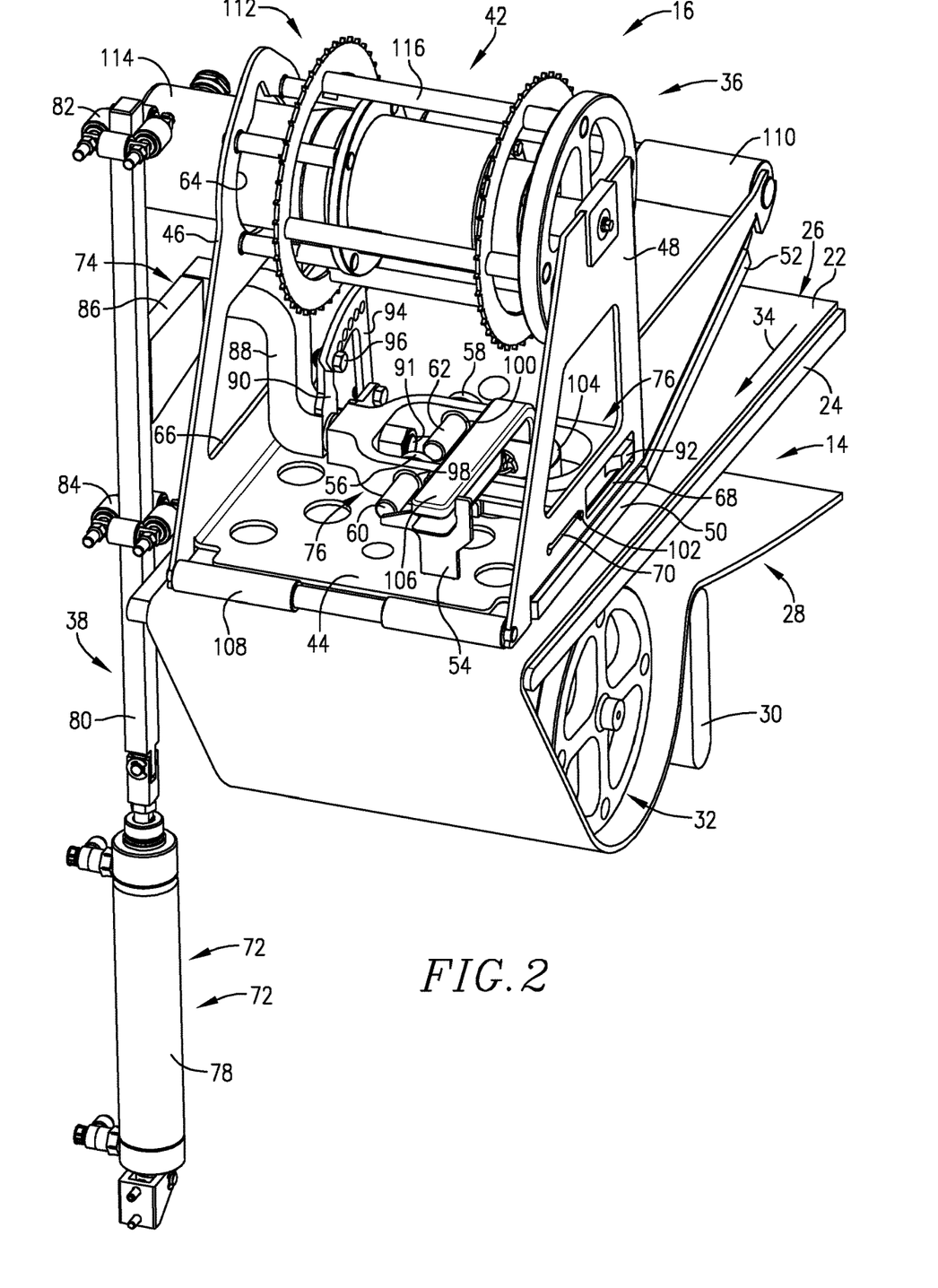
FIG. 2 is a fragmentary perspective view of the output end of the upper conveyor unit of the slicer apparatus of FIG. 1 in the operational position thereof, with parts broken away to reveal the internal construction of the upper conveyor unit.

In more detail, the lower conveyor unit 14 includes an elongated, continuous metal wire mesh conveyor belt 22, which is trained around an uppermost planar support 24 to define the upper run 26 of the lower conveyor unit 14. The lower run 28 is draped over lower support 30 and is engaged by a motor driven sprocket wheel assembly 32. Rotation of the assembly 32 causes movement of belt 22 along the direction of arrow 34 (FIG. 2).

The slicer assembly 18 is itself conventional, and may include a variety of different slicing knives or similar equipment. Thus, for certain products, rotary blade(s) may be provided to slice the product emerging from the conveyor units 14, 16 transversely relative to the path of travel thereof. In other instances, a series of gang knives may be provided for slicing the product longitudinally. Accordingly, it will be understood that any kind of slicing or cutting assembly may be used in the context of the apparatus 10.

As illustrated, the output conveyor 20 is disposed below the slicer assembly 18, to collect cut or sliced products gravitating from the slicer assembly. Thus, this output conveyor 20 is also entirely conventional.

The upper conveyor unit 16 includes a shiftable frame assembly 36, support structure 38 for the frame assembly 36, a continuous metal wire mesh conveyor belt 40, and a belt support assembly 42.

The frame assembly 36 includes a bottom plate 44 with upstanding side plates 46 and 48. As illustrated, bottom plate 44 has a lowermost friction-reducing and removable segment 50 with a similar, rearwardly extending oblique segment 52. The bottom plate supports a bracket 54, as well as a pair of spaced apart, upstanding pin mounts 56, 58 supporting elongated, stationary, aligned, pivot pins 60, 62, which are important for purposes to be described. The side plate 46 has an upper substantially circular opening 64 designed to receive a motor/sprocket subunit, and a lower, generally trapezoidal opening 66. The opposed side plate 48 includes an elongated movement-limiting slot 68, as well as a spring return slot 70.

The support structure 38 for frame assembly 36 has a pneumatic piston-and-cylinder assembly 72, a support arm 74, and a somewhat rectangular carriage 76. The assembly 72 includes a cylinder 78 and an elongated, up-and-down shiftable piston rod 80. Spaced apart upper and lower roller guides 82, 84 mounted on bulkhead 12a guide the reciprocation of rod 80. The support arm 74 includes a fore-and-aft extension 86 which is secured to the upper end of rod 80, and a depending, transverse section 88 which extends through the opening 66. The lower end of section 88 is equipped with an upstanding apertured ear 90 and pivot pin 91 (FIG. 2) which rotatively supports the carriage 76 in a cantilever fashion. The end of carriage 76 has a protruding lug 92, which is received within the slot 68. A generally L-shaped, upstanding, apertured crank 94 is secured to the carriage 76 as shown, and a bolt 96 serves to interconnect the crank 94 and the upper end of ear 90 to obtain the desired position of conveyor 16.

Figure 3:
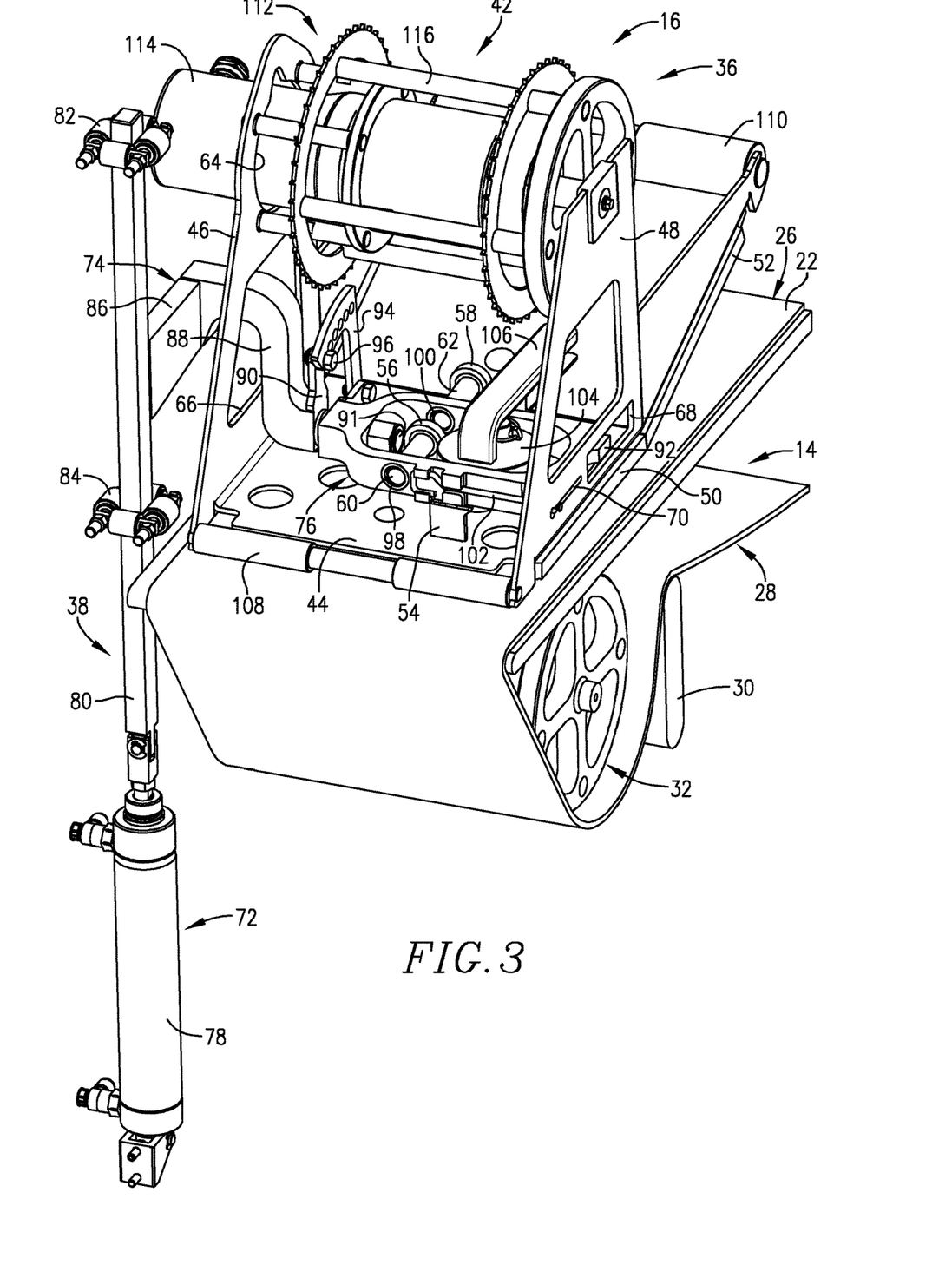
FIG. 3 is a fragmentary perspective view similar to that of FIG. 2, but illustrating the upper conveyor unit in its retracted position.
Figure 4:
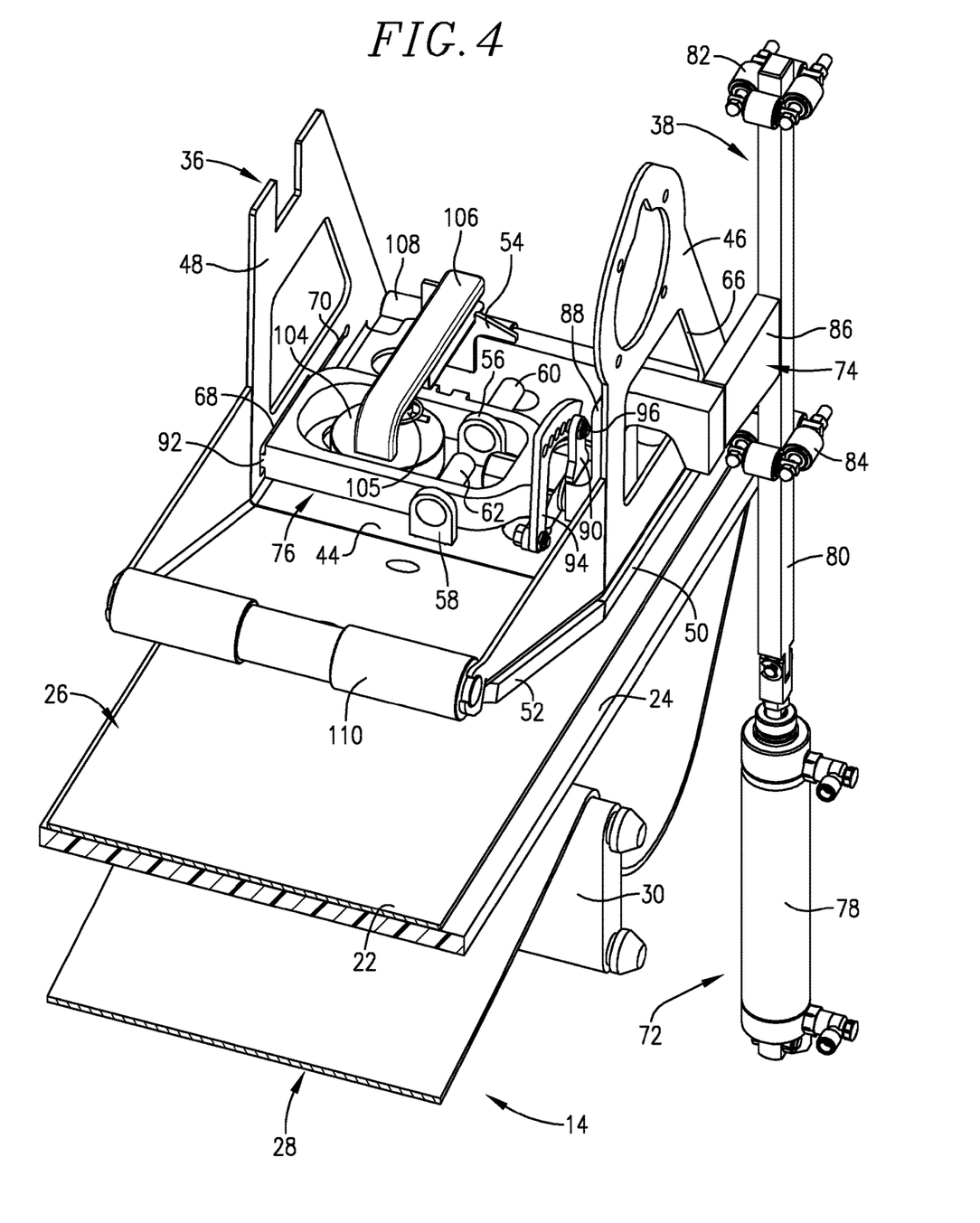
FIG. 4 is a perspective view of the input end of the upper conveyor unit in the operational position thereof, with parts broken away to reveal the internal construction of the upper conveyor unit.

The carriage 76 has a pair of aligned openings 98, 100 which receive the pivot pins 60 and 62. Further, the carriage 76 has an elongated stabilizing spring 102, which extends through the slot 70 (see FIG. 3).

Figure 5:
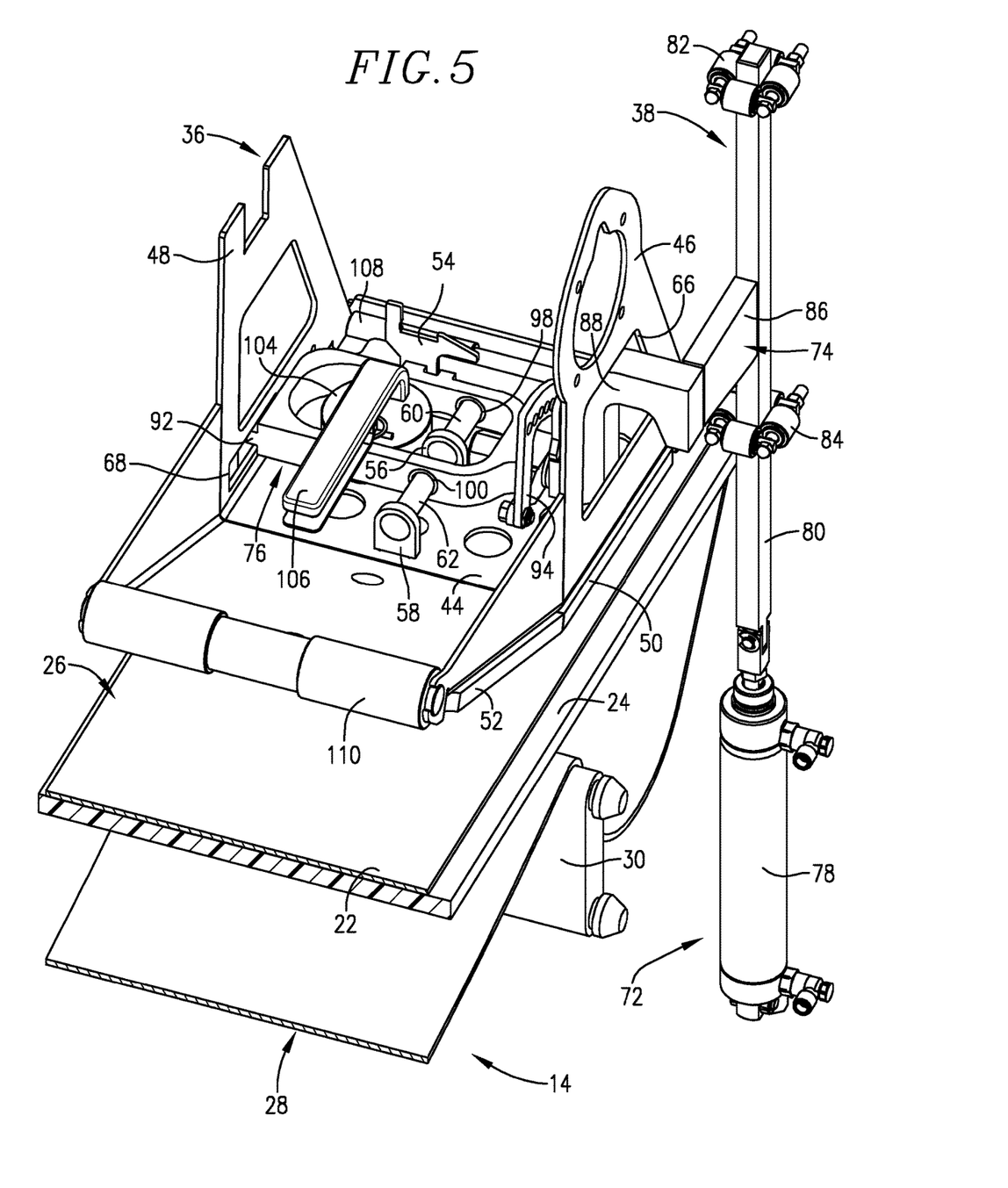
FIG. 5 is a view similar to that of FIG. 4, but depicting the upper conveyor unit in its retracted position.
Figure 6:
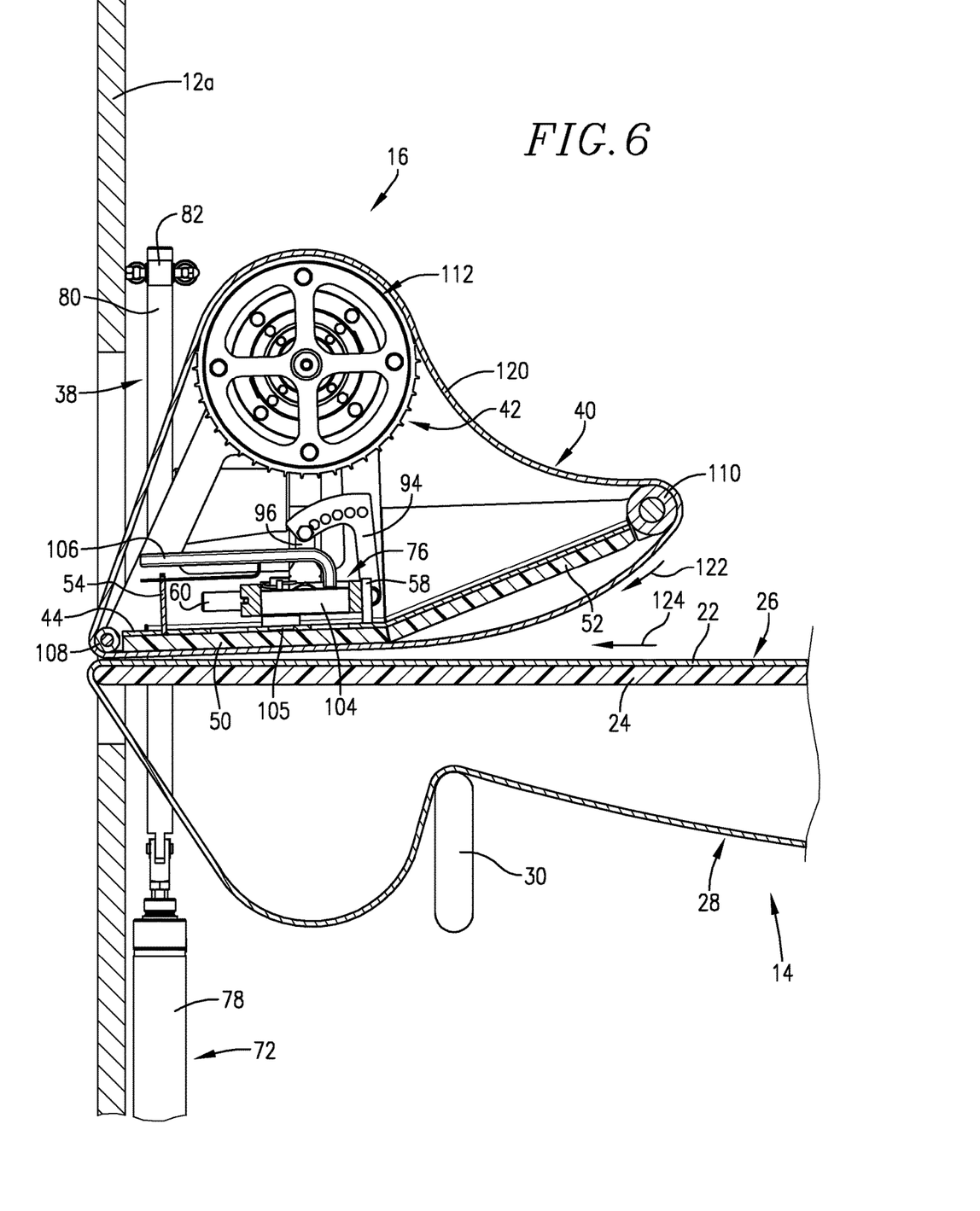
FIG. 6 is a fragmentary vertical sectional view of the dual conveyor belt slicer apparatus of the invention, shown with the upper conveyor unit of the apparatus in the operating position thereof, and with certain parts removed.
Figure 7:
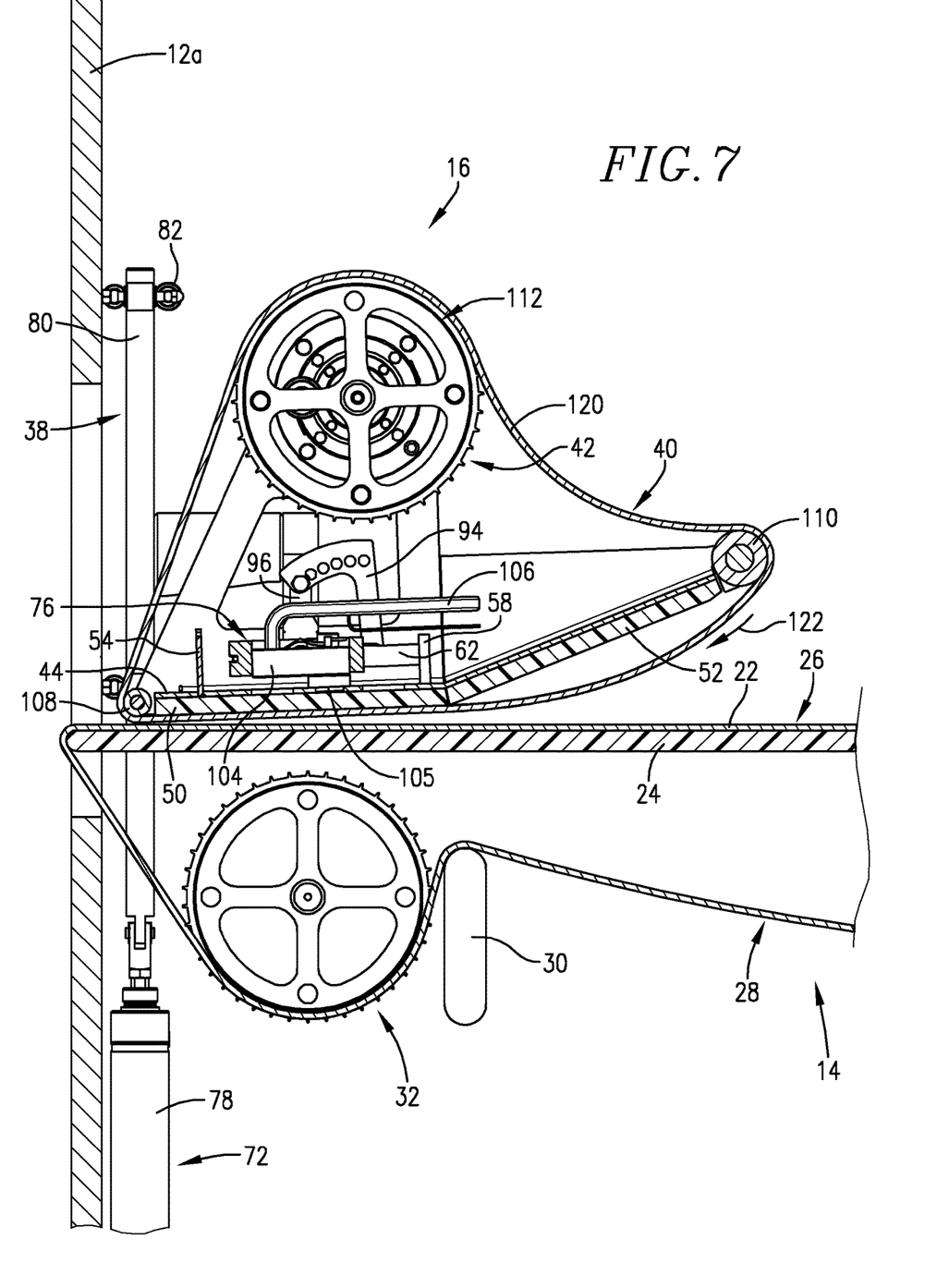
FIG. 7 is a vertical sectional view similar to that of FIG. 6, but illustrating the upper conveyor unit in its retracted position.

A rotary cam block 104 is situated within the carriage 76 and is operably coupled with bottom plate 44 by pivot pin 105 (FIG. 6). A handle 106 is secured to block 104 in order to rotate the latter and thus shift frame assembly 36 fore and aft between an operating position, illustrated in FIGS. 2, 4, 6, and 8, and a retracted position, illustrated in FIGS. 3, 5, and 7. In the operating position, handle 106 engages the bracket 54.

The belt support assembly 42 includes fore-and-aft idler rollers 108 and 110, as well as a motor/sprocket subunit 112. The latter is supported by the side plates 46, 48 and includes an electric drive motor 114 and a dual sprocket assembly 116. The conveyor belt 40 is trained around the sprocket assembly 116 and the idler rollers 108, 110 to define a lower run 118 and an upper run 120. Rotation of the sprocket assembly 116 serves to shift belt 40 in the direction of arrow 122 (FIG. 7)).

Generally speaking, the operation of slicer apparatus 10 involves simultaneous shifting of the conveyor belts 22 and 24 along the directions of arrows 34 and 122, with the lower run 118 of belt 40 being above the upper run of belt 22. This causes products deposited on lower belt 22 rearwardly of upper conveyor unit 16 to pass along a path of travel 124 (FIG. 6) from the rearward end of unit 16 to the forward end thereof, thereby moving the products toward and into the slicer assembly 18.

The operation of slicer apparatus 10, and particularly upper conveyor unit 16, is established and maintained by means of a digital controller (not shown), such as programmable logic controller (PLC), which is operably coupled to, inter alia, the assembly 32 of lower conveyor unit 14, piston-and-cylinder assembly 72, and motor/sprocket subunit 112. Thus, control of the assembly 32 and subunit 112 governs the speed of movement of the conveyor belts 22 and 40. Digital control of the assembly 72 also establishes a predetermined downward force to be exerted against products passing along the path of travel 124 and between the conveyor units 16, 14. That is, the weight of upper unit 16 is considerable, and could easily deform or crush soft meat or other products. In order to prevent such an outcome, the assembly 72 is operated so as to elevate the upper conveyor unit 16 relative to the lower conveyor unit 14, thereby effectively reducing the downwardly directed force exerted by the upper unit 16 against the products. Desirably, the digital controller is used to select the magnitude of the downwardly directed force from upper unit 16, for each particular product to be processed. For example, thick, coarse meats such as bacon slabs can accommodate larger downwardly directed forces as compared with soft sausage products or the like. Once the operator selects the desired magnitude of downwardly directed force for the product in question, this is maintained during operation of the apparatus 10 by provision of a digital pressure regulator (not shown) operably coupled with the assembly 72. Such pressure regulators are known, and employ proportional-integral-derivative (PID) control technology. Once such regulator is a Festo VPPM-8L-L-1-N14-OL6H-A4.

Moreover, this type of control arrangement allows the apparatus 10 to readily accommodate products of irregular shape and cross-section. As such products pass between the upper and lower conveyor units 16, 14, the upper unit 16 may be deflected upwardly against the bias of the assembly 72 until the product passes completely through conveyors and is processed in slicer assembly 18. The digital pressure regulator would then operate to reestablish the predetermined, substantially constant, downwardly directed force exerted by the unit 16. Provision of the oblique segment 52 permits entrance of such products into the path of travel 124 through the conveyor units.

Figure 8:
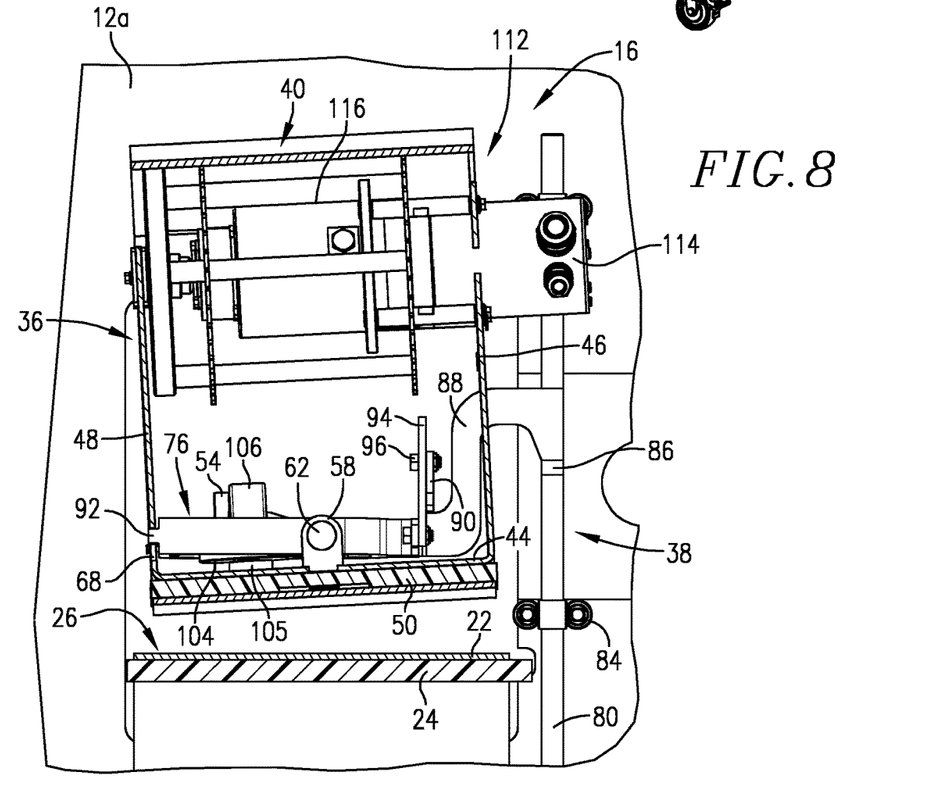
FIG. 8 is a vertical sectional view illustrating the side-to-side pivoting of the upper conveyor unit during use thereof, in order to accommodate product of variable dimensions.

It may also occur that given products to be processed have irregular cross-sections. These conditions are accommodated in the apparatus 10, owing to the fact that the entire conveyor unit 16 may pivot about the axis of the pivot pins 60 and 62, i.e., in a side-to-side manner, as best illustrated in FIG. 8. The extent of such side-to-side pivoting is limited by the protrusions 92 within the slot 68. After tilting of the unit 16 in this fashion, the stabilizing spring 102 acts to return the unit 16 to its equilibrium, non-tilted position. Thus, the apparatus 10 affords bidirectional tilting of the upper conveyor 16 along respective pivot axes generally parallel with the path of travel 124, and transverse to such path of travel, all in a controlled fashion maintaining the predetermined downwardly directed force against products passing through the apparatus.

It will be appreciated that the pivoting movement of conveyor unit 16 about the axis of pins 60 and 62, and about pin 91, occurs without affecting or altering the position of the lower conveyor unit 14 and belt 22, i.e., such pivoting movement is independent of the lower conveyor unit 14.

The angular orientation of the unit 16 relative to unit 14 can be adjusted by provision of the crank 94. That is, the entire frame assembly 36, and thus the entirety of the unit 16, can be angularly adjusted by removing the bolt 96, pivoting the unit to the extent desired until the corresponding crank opening is aligned with the opening of ear 90, and then reinstalling the bolt 96.

After use of the apparatus 10, cleanup is required. This is facilitated by means of the cam block 104 and handle 106. That is, the handle 106 can be rotated from the position shown in FIG. 2 to that of FIG. 3. This serves to linearly shift the frame assembly 36 rearwardly to the FIG. 3 position, thereby allowing easy removal of the belt 40 and exposing the forward end of the belt 22 for cleanup purposes.

While the invention has been particularly described in the context of a food slicing apparatus, the invention is not so limited. That is, the dual conveyor assembly may be used with other types of downstream processing equipment, such as surface applicators or packaging devices. Furthermore, the invention can be used for processing virtually any type of products having a size and shape consistent with the dual conveyor assembly, and is not limited to foods.

In like manner, while a pneumatic piston-and-cylinder assembly has been described in connection with the control apparatus, other types of equipment may be used. Such include hydraulic piston-and-cylinder assemblies, rodless cylinders, electromagnetic actuators, and servo-actuators. Similarly, while mesh conveyor belts are employed in the disclosed embodiment, other types of belts may be used, such as synthetic resin (e.g., polyurethane) or steel chain belts

We claim:

1. A conveyor assembly operable to move product toward and into a downstream processing device, said assembly comprising:
    a lower conveyor unit having a shiftable lower conveyor belt presenting an upper run and a lower run;
    an upper conveyor unit having a shiftable upper conveyor belt presenting an upper run and a lower run;
    a structure supporting said upper conveyor unit above said lower conveyor unit with the lower run of the upper conveyor belt adjacent the upper run of the lower conveyor belt to define therebetween a product passageway, so that shifting of the upper and lower conveyor belts will move said product along a path of travel toward and into said downstream processing device,
    said supporting structure including a shiftable frame assembly located between the upper and lower runs of the conveyor belt of said upper conveyor unit,
    said supporting structure further including a control apparatus comprising a force-generating device operably coupled with said upper conveyor unit, and a digital controller coupled with said device, in order to maintain a predetermined, substantially constant force against said product as it is moved by said upper and lower conveyor belts, notwithstanding irregularities in the size and shape of the product; and
    a pivoting mechanism allowing the upper conveyor unit to pivot about an axis generally parallel with said product path of travel, and also about an axis transverse to said product path of travel, said pivoting occurring without altering the position of said lower conveyor belt, said pivoting mechanism comprising a pivot pin coupled with said frame assembly.

2. The conveyor assembly of claim 1, said control apparatus comprising a pneumatic piston-and-cylinder assembly coupled with said upper conveyor unit and operable to raise and lower the upper conveyor unit in order to maintain said substantially constant force.

3. The conveyor assembly of claim 1, said processing device comprising a slicer assembly.

4. The conveyor assembly of claim 1, including a position adjustment mechanism allowing translation of said upper conveyor unit relative to said lower conveyor unit.

5. The conveyor assembly of claim 1, said frame assembly having an equilibrium position, there being spring means operably coupled with said frame assembly for returning the frame assembly to said equilibrium position after pivoting of the frame assembly about said axis generally parallel with said product path of travel.

6. An upper conveyor unit designed to be positioned above a lower conveyor unit, the upper and lower conveyor units having respective, shiftable, upper and lower conveyor belts, said conveyor belts oriented to define therebetween a product passageway so that shifting of the belts will move product along a path of travel towards and into a downstream processing device, said upper conveyor unit having a control apparatus comprising a force-generating device separate from and not in force-transmitting contact with said upper conveyor belt and operably coupled with said upper conveyor unit, and a digital controller coupled with said device, in order to maintain a predetermined, substantially constant force against said product as it is moved by said upper and lower conveyor belts, notwithstanding irregularities in the size and shape of the product, a pivoting mechanism allowing the upper conveyor unit to pivot about an axis generally parallel with said product path of travel, and also about an axis transverse to said product path of travel.

7. The upper conveyor unit of claim 6, said control apparatus comprising a pneumatic piston-and-cylinder assembly operable to raise and lower the upper conveyor unit in order to maintain said substantially constant force.

8. The upper conveyor unit of claim 7, said control apparatus including a PID regulator operably coupled with said piston-and-cylinder assembly.

9. The upper conveyor unit of claim 6, including a positioning mechanism permitting alteration of the position of said upper conveyor unit in order to change the angle between said upper and lower conveyor belts, said positioning mechanism comprising a crank having a series of spaced apart apertures, and a positioning bolt insertable in any of the apertures.

10. The upper conveyor unit of claim 6, including a position adjustment mechanism allowing translation of said upper conveyor unit relative to said lower conveyor unit.

11. The upper conveyor unit of claim 6, said upper conveyor unit having an equilibrium position, there being spring means operably coupled with said upper conveyor unit for returning the upper conveyor unit to said equilibrium position after pivoting of the conveyor assembly about said axis generally parallel with said product path of travel.

12. An upper conveyor unit designed to be positioned above a lower conveyor unit, the upper and lower conveyor units having respective, shiftable, upper and lower conveyor belts, said conveyor belts oriented to define therebetween a product passageway so that shifting of the belts will move product along a path of travel towards and into a downstream processing device, said upper conveyor unit comprising a pivoting mechanism allowing the upper conveyor unit to pivot about an axis generally parallel with said product path of travel, and also about an axis transverse to the product path of travel, said pivoting occurring without altering the position of said lower conveyor belt.

13. The upper conveyor unit of claim 12, including a position adjustment mechanism allowing translation of said upper conveyor unit relative to said lower conveyor unit.

14. The upper conveyor unit of claim 12, said upper conveyor unit having an equilibrium position, there being spring means operably coupled with said upper conveyor unit for returning the upper conveyor unit to said equilibrium position after pivoting of the conveyor assembly about said axis generally parallel with said product path of travel.

15. An upper conveyor unit designed to be positioned above a lower conveyor unit, the upper and lower conveyor units having respective, shiftable, upper and lower conveyor belts, said conveyor belts oriented to define therebetween a product passageway so that shifting of the belts will move product along a path of travel towards and into a downstream processing device, said upper conveyor unit having a control apparatus comprising a force-generating device separate from and not in force-transmitting contact with said upper conveyor belt and operably coupled with said upper conveyor unit, and a digital controller coupled with said device, in order to maintain a predetermined, substantially constant force against said product as it is moved by said upper and lower conveyor belts, notwithstanding irregularities in the size and shape of the product, said upper conveyor unit further including a positioning mechanism permitting alteration of the position of said upper conveyor unit to change the angle between said upper and lower conveyor belts, said positioning mechanism comprising a crank having a series of spaced apart apertures, and a positioning bolt insertable in any of the apertures.

\* \* \* \* \*